MULTIPLE DISK SHAFT COUPLER

Filed Dec. 26, 1961

INVENTOR.
ARNOLD A. SPIELBAUER
BY Max Moody
ATTORNEY 3,116,619
MULTIPLE DISK SHAFT COUPLER
Arnold A. Spielbauer, Cedar Rapids, Iowa, assignor to Collins Radio Company, Cedar Rapids, Iowa, a corporation of Iowa
Filed Dec. 26, 1961, Ser. No. 161,957
2 Claims. (Cl. 64—31)

This invention relates to coupling mechanisms and particularly to a device for coupling a pair of shafts so as to correct any misalignment which may exist.

Various coupling devices have been known in the past for coupling shafts together. One such device is the Oldham coupler, wherein each shaft has connected to it a disk with a projection which extends from its face. A coupling disk is formed with two slots at right angles to each other and on opposite sides of the disk and is mounted between the other two disks and provides a coupling which corrects for misalignment of the shafts. Such couplings are relatively thick and a relatively large amount of longitudinal movement of the shafts must be made to attach the coupling.

It is an object of the present invention, therefore, to provide a much thinner coupling than the Oldham coupler, and which may be inexpensively and easily manufactured.

It is an object of this invention to provide an improved and smaller coupling device for connecting a pair of shafts.

Another object is to provide a more positive coupling device which does not have a loose piece that will fall when the shafts are separated.

A feature of this invention is found in the provision for an improved shaft coupling mechanism wherein a pair of disks are mounted on the ends of shafts to be coupled and each disk is provided with a pair of pins extending from its inner face and which may be received within loose openings formed in the other disks. A thin transfer disk is formed with four slots of widths just sufficient to receive the pins therein and is movably attached to the face of one of the other disks.

Further objects, features and advantages of this invention will become apparent from the following description and claims when read in view of the accompanying drawings, in which:

Figure 1:
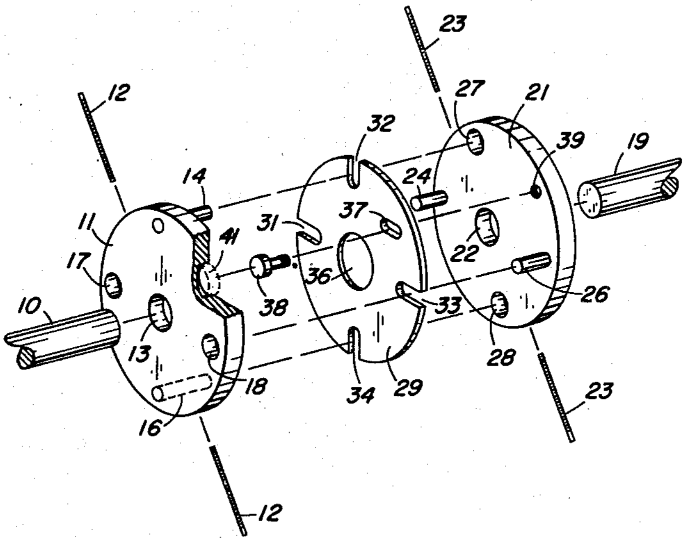
FIGURE 1 is an exploded view of the coupling device of this invention.

FIGURE 1 illustrates a first shaft 10 to which is connected a driving coupling disk 11 by set screws 12 which are threadedly mounted in the disk. The disk 11 is formed with a center opening 13 and has a pair of cylindrical pins 14 and 16 which are attached to its face and extend outwardly therefrom. These pins are in transverse alignment with the opening 13. A pair of openings 17 and 18 are formed through the disk 11 and are of larger diameter than pins 14 and 16. They are transversely aligned with the opening 13 on a line which is at right angles to the line through the pins 14 and 16. A second shaft 19 which is to be coupled to the shaft 10 carries a second coupling disk 21 which is formed with a central opening 22 into which shaft 19 is received and to which it may be locked by suitable set screws 23.

A pair of cylindrical pins 24 and 26 extend from the surface of the disk 21 and are mounted on a transverse line which extends through the opening 22. A pair of openings 27 and 28 are formed through the disk 21 and are mounted on a transverse line which is at right angles to the transverse line which extends through pins 24 and 26.

A thin coupling disk 29 is formed with four slots 31, 32, 33 and 34 about its periphery. A central opening 36 is formed in the disk 29 and a slot 37 is formed through the disk between slots 32 and 33. The width of slots 31, 32, 33 and 34 is such that the pins 14 and 16, 24 and 26 will fit therein, rather snugly. A locking pin 38 passes through the slot 37 and is threadedly received in an opening 39 in disk 21 to loosely hold disk 29 to disk 21. The pins 24 and 26 are received in slots 31 and 33. It is to be noted that the disk 29 may move transversely of the disk 21 due to the slot 37.

The pins 14 and 16 extend through slots 32 and 34 and into openings 27 and 28 of disk 21 and may move up and down relative to FIGURE 1 during rotation of shafts 10 and 19. A recess 41 is formed in end disk 11 to receive and provide floating transverse clearance for the head of pin 38 therein.

Thus, there is provided a coupling mechanism which allows a certain degree of misalignment between shafts 10 and 19. It is to be realized that the openings 17 and 18, 27 and 28 are larger than the pins 24 and 26, 14 and 16. The widths of slots 31 through 34 are such as to receive the pins 14 and 16, 24 and 26 therein, but fit rather snugly.

Figure 2:
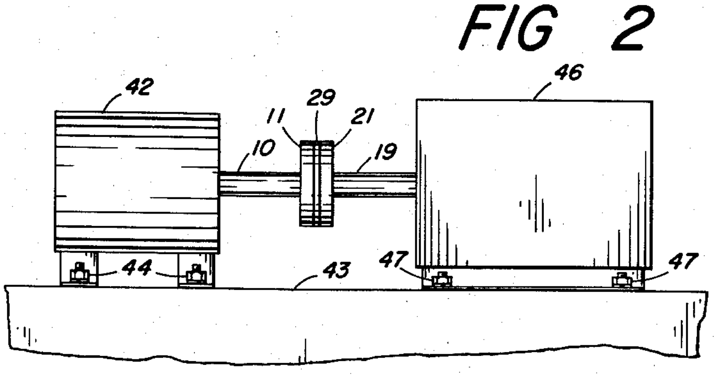
FIGURE 2 is a side assembled view of the coupling device of this invention.

In operation, as shown in FIGURE 2, a motor 42 might be connected to shaft 10, is connected to a base plate 43 by suitable holding means, as for example, bolts 44. The shaft 19 might be connected to an oscillator 46 in a radio. The oscillator may be attached to the base plate 43 by bolts 47.

The motor 42 may be disconnected from the oscillator 46 by loosening the bolts 44 and moving the motor to the left relative to FIGURE 2. To connect motor 42 to the oscillator 46, the motor 42 would be placed against the base 43 and moved toward the oscillator 46 until the disk 11 engages the disk 29, it being realized, of course, that the pins 14 and 16 would be aligned with the slots 32 and 34 and the head of the pin 38 would be received in the recess 41 in disk 11.

The motor is then attached to base 43 by bolts 44. Misalignment of the shafts is compensated by the coupling mechanism. Pins 26 and 24 will engage the edges of slots 31 and 33 and pins 14 and 16 can move in slots 32 and 34. The openings 27 and 28, 17 and 18 are larger than the pins 14 and 16, 24 and 26 to allow a degree of freedom. It is to be noted that when the unit is disassembled, the unit 29 does not fall due to pin 38. The thinness of the disk 29 results in a unit about one-half the thickness of an Oldham coupler of the same diameter.

Although this invention has been described with respect to particular embodiments thereof, it is not to be so limited, as changes and modifications may be made therein which are within the spirit and scope of the invention as defined by the appended claims.

I claim:

1. A device for coupling first and second shafts comprising a first disk attached to the end of the first shaft, a pair of through openings formed on a first transverse line across a face of the first disk, a pair of cylindrical pins extending from the first disk and mounted on a second transverse line substantially at right angles to the first transverse line extending across the openings, a second disk attached to the end of the second shaft and formed with a pair of through openings on a first transverse line, a pair of cylindrical pins attached to the second disk and mounted on a transverse line substantially at right angles to the transverse line passing through the opening, a coupling disk with four slots formed extending from its periphery toward the center of the disk, said coupling disk being mounted between the first and second disk and with the pins of said first and second disks received in the slots of said coupling disk.

2. An apparatus according to claim 1, wherein said coupling disk is loosely attached to said second disk for back and forth transverse movement of the coupling disk along a path of movement parallel to the transverse line extending through the pins of said second disk, with the attaching means comprising: a retaining pin mounted on said second disk and extending through a retaining pin slot of said coupling disk, said retaining pin slot being a relatively close free sliding fit to the shank of said retaining pin, said retaining pin slot being defined by slot edges extending longitudinally substantially parallel to the transverse line extending through the pins of said second disk, and said retaining pin being provided with a retaining head wider than the spacing of the edges of said retaining pin slot.

References Cited in the file of this patent

UNITED STATES PATENTS

| | | |
|---|---|---|
| 1,488,497 | Higgins | Apr. 1, 1924 |
| 1,567,145 | Higgins | Dec. 29, 1925 |
| 2,612,764 | Wilken | Oct. 7, 1952 |
| 2,756,573 | Colby et al. | July 31, 1956 |